(12) United States Patent
Omata et al.

(10) Patent No.: US 11,686,365 B2
(45) Date of Patent: Jun. 27, 2023

(54) CYLINDER DEVICE AND ROD MANUFACTURING METHOD

(71) Applicant: Hitachi Astemo, Ltd., Ibaraki (JP)

(72) Inventors: Yasuhisa Omata, Yokohama (JP); Naoya Kubo, Itoshima (JP); Toshifumi Komatsu, Okayama (JP); Ikuo Akai, Atsugi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 112 days.

(21) Appl. No.: 16/976,806

(22) PCT Filed: Sep. 20, 2018

(86) PCT No.: PCT/JP2018/034745
§ 371 (c)(1),
(2) Date: Aug. 31, 2020

(87) PCT Pub. No.: WO2019/187220
PCT Pub. Date: Oct. 3, 2019

(65) Prior Publication Data
US 2021/0003188 A1 Jan. 7, 2021

(30) Foreign Application Priority Data

Mar. 28, 2018 (JP) .............................. 2018-062474

(51) Int. Cl.
*B23K 20/12* (2006.01)
*F16F 9/34* (2006.01)
(Continued)

(52) U.S. Cl.
CPC ............... *F16F 9/34* (2013.01); *B23K 20/12* (2013.01); *B23K 20/129* (2013.01);
(Continued)

(58) Field of Classification Search
None
See application file for complete search history.

(56) References Cited

U.S. PATENT DOCUMENTS

| | | | | |
|---|---|---|---|---|
| 2008/0101857 A1* | 5/2008 | Christ | ...................... | B21J 5/066 403/272 |
| 2009/0305077 A1* | 12/2009 | Mizuguchi | ............. | B23K 20/12 428/615 |
| 2010/0040900 A1* | 2/2010 | Sumi | .................. | B23K 20/2336 228/114.5 |

FOREIGN PATENT DOCUMENTS

| | | |
|---|---|---|
| CN | 204458963 U | 7/2015 |
| JP | 57-127939 U | 8/1982 |

(Continued)

OTHER PUBLICATIONS

International Search Report of PCT/JP2018/034745 dated Nov. 6, 2018.

(Continued)

*Primary Examiner* — Devang R Patel
(74) *Attorney, Agent, or Firm* — Mattingly & Malur, PC

(57) ABSTRACT

In a cylinder device, a rod of which one end portion is joined to a piston in a cylinder and the other end portion protrudes from an opening portion of the cylinder includes a first member that is a hollow cylindrical member in sliding contact with a sliding contact member, and a second member that does not come into sliding contact with the sliding contact member. An outer diameter of at least a first member side end portion of the second member is smaller than an outer diameter of the first member. An inner peripheral portion of the first member is joined to an outer peripheral portion of the second member by friction weld joining.

3 Claims, 10 Drawing Sheets

(51) Int. Cl.
   *B23K 101/00*    (2006.01)
   *B23K 101/04*    (2006.01)
   *F16F 9/32*      (2006.01)

(52) U.S. Cl.
   CPC .... *B23K 2101/006* (2018.08); *B23K 2101/04* (2018.08); *F16F 9/3214* (2013.01)

(56) References Cited

FOREIGN PATENT DOCUMENTS

| | | | | |
|---|---|---|---|---|
| JP | 63-256287 A | 10/1988 | | |
| JP | 63256287 A * | 10/1988 | ............ | B23K 20/12 |
| JP | 2000-161414 A | 6/2000 | | |
| JP | 2000-343246 A | 12/2000 | | |
| JP | 2001-18129 A | 1/2001 | | |
| JP | 2001018129 A * | 1/2001 | | |
| JP | 2004-66336 A | 3/2004 | | |
| JP | 2013-181561 A | 9/2013 | | |
| JP | 5873737 B | 1/2016 | | |
| WO | WO-2017110641 A1 * | 6/2017 | ................ | F16F 9/32 |

OTHER PUBLICATIONS

Written Opinion of PCT/JP2018/034745 dated Nov. 6, 2018.
Japanese Office Action received in corresponding Japanese Application No. 2020-508960 dated Apr. 6, 2021.
German Office Action received in corresponding German Application No. 11 2018 007 369.6 dated Oct. 7, 2021.

\* cited by examiner

CYLINDER DEVICE AND ROD MANUFACTURING METHOD

TECHNICAL FIELD

The present invention relates to a cylinder device and a method for producing a rod.

Priority is claimed on Japanese Patent Application No. 2018-062474, filed Mar. 28, 2018, the content of which is incorporated herein by reference.

BACKGROUND ART

There is a technique of friction-welding two members to produce a rod (for example, refer to Patent Literature 1).

CITATION LIST

Patent Literature

[Patent Literature 1]
Japanese Patent No. 5873737

SUMMARY OF INVENTION

Technical Problem

By the way, it is desired to facilitate producing a cylinder device.

Therefore, an object of the invention is to provide a cylinder device and a method for producing a rod by which the production can be facilitated.

Solution to Problem

In order to achieve the above object, according to an aspect of the invention, there is provided a cylinder device including: a rod including a first member in sliding contact with a sliding contact member and a second member that does not come into sliding contact with the sliding contact member. An outer diameter of at least a first member side end portion of the second member is smaller than an outer diameter of the first member. An inner peripheral portion of the first member is joined to an outer peripheral portion of the second member by friction weld joining.

According to another aspect of the invention, there is provided a method for producing a rod, the method including: a step of preparing a first member that is hollow and is a portion of the rod, the portion being in sliding contact with a sliding contact member, and a second member that is a portion of the rod, the portion not coming into sliding contact with the sliding contact member, and is formed to have a portion having a smaller outer diameter than an outer diameter of the first member; a step of causing an inner peripheral surface of the first member and an outer peripheral surface of the second member to approach each other while rotating at least one of the first member and the second member; and a step of pushing the first member and the second member into each other by a predetermined amount in an axial direction after the inner peripheral surface of the first member and the outer peripheral surface of the second member are brought into contact with each other, to join the first member and the second member by friction weld joining.

Advantageous Effects of Invention

According to the present invention, the production of the cylinder device can be facilitated.

DESCRIPTION OF EMBODIMENTS

A cylinder device and a method for producing a rod according to one embodiment of the invention will be described below with reference to the drawings.

Figure 1:
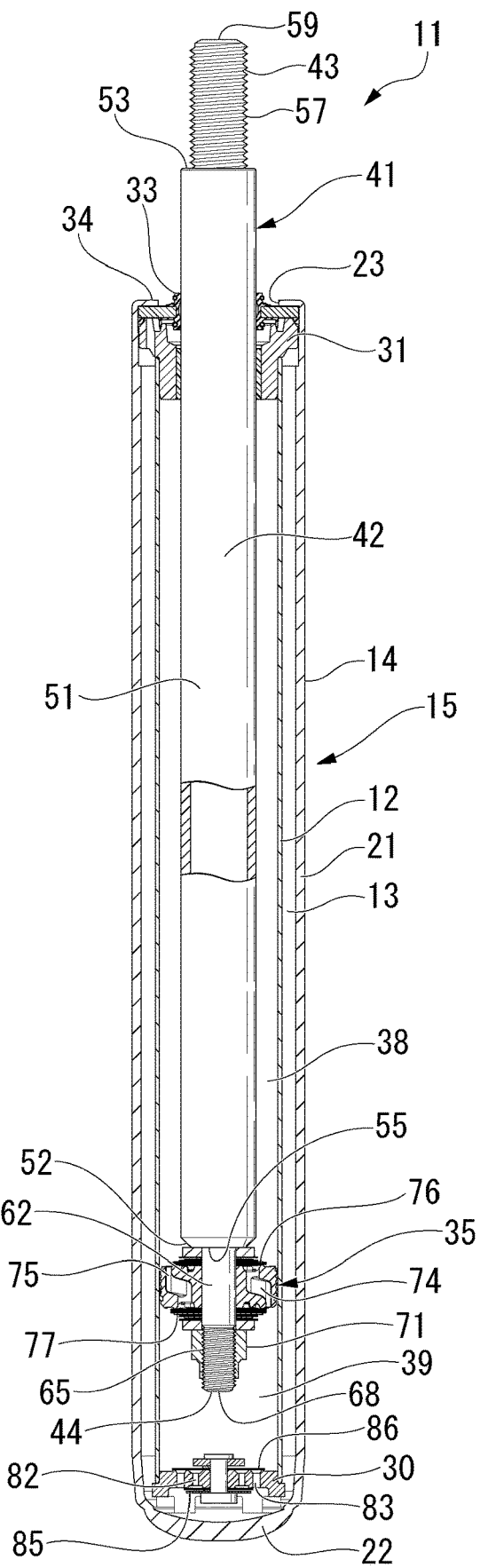
FIG. 1 is a sectional view illustrating a cylinder device according to one embodiment of the invention.

FIG. 1 illustrates a cylinder device 11 of the present embodiment. The cylinder device 11 is a shock absorber used in a suspension apparatus of a vehicle such as an automobile or a railroad vehicle, specifically, is a shock absorber used in a strut suspension of an automobile. The cylinder device 11 includes an inner cylinder 12 which has a cylindrical shape and in which a working liquid as a working fluid is sealed, and an outer cylinder 14 that has a bottomed cylindrical shape having a larger diameter than the inner cylinder 12 and is provided on an outer peripheral side of the inner cylinder 12 to form a reservoir chamber 13 between the inner cylinder 12 into which a working liquid and a working gas as a working fluid are sealed. The inner cylinder 12 and the outer cylinder 14 form a cylinder 15 having a double cylindrical shape.

The outer cylinder 14 is an integrally formed article that is formed of one metallic member. The outer cylinder 14 has a lateral wall portion 21 having a cylindrical shape, a bottom portion 22 that closes one axial end side of the lateral wall portion 21, and an opening portion 23 on an opposite side of the lateral wall portion 21 from the bottom portion 22. In other words, the outer cylinder 14 has the opening portion 23 on one end side and the bottom portion 22 on the other end side. The opening portion 23 on one end side of the outer cylinder 14 is the opening portion 23 on one end side of the cylinder 15. The inner cylinder 12 is an integrally formed article that is formed of one metallic member, and has a cylindrical shape.

The cylinder device 11 includes a base member 30 that has a disk shape and is fitted to one axial end portion of the inner cylinder 12, and a rod guide 31 (sliding contact member) that has an annular shape and is fitted to the other axial end portion of the inner cylinder 12 and an opening portion 23 side in an axial direction of the lateral wall portion 21 of the outer cylinder 14. The inner cylinder 12 is engaged with the bottom portion 22 of the outer cylinder 14 via the base member 30 and is engaged with the opening portion 23 side of the lateral wall portion 21 of the outer cylinder 14 via the rod guide 31. In this state, the inner cylinder 12 is positioned in a radial direction with respect to the outer cylinder 14.

The cylinder device 11 includes a seal member 33 (sliding contact member) having an annular shape on an opposite side of the rod guide 31 from the bottom portion 22. Similar to the rod guide 31, the seal member 33 is also fitted to an inner peripheral portion on the opening portion 23 side of the lateral wall portion 21. A swaged portion 34 that is plastically deformed inward in the radial direction by curling is formed in an end portion on the opposite side of the lateral wall portion 21 from the bottom portion 22. The seal member 33 is interposed between the swaged portion 34 and the rod guide 31. The seal member 33 seals an opening portion 23 side of the outer cylinder 14, namely, an opening portion 23 side of the cylinder 15.

The cylinder device 11 includes a piston 35 provided in the cylinder 15. The piston 35 is slidably fitted into the inner cylinder 12 of the cylinder 15. The piston 35 slides in the inner cylinder 12 of the cylinder 15 and divides the inside of the inner cylinder 12 into two chambers, namely, a first chamber 38 and the second chamber 39. The first chamber 38 is provided between the piston 35 in the inner cylinder 12 and the rod guide 31, and the second chamber 39 is provided between the piston 35 in the inner cylinder 12 and the base member 30. The second chamber 39 in the inner cylinder 12 is partitioned off from the reservoir chamber 13 by the base member 30 provided on one end side of the inner cylinder 12. The first chamber 38 and the second chamber 39 are filled with an oil liquid that is a working liquid, and the reservoir chamber 13 is filled with gas that is a working gas and an oil liquid that is a working liquid.

The cylinder device 11 includes a rod 41 of which one end portion is joined to the piston 35 in the cylinder 15 and the other end portion protrudes from the opening portion 23 of the cylinder 15. The rod 41 has a main shaft 42 (first member) in an intermediate location in the axial direction, a mounting shaft 43 (second member) at one end in the axial direction, and a coupling shaft 44 (second member) at the other end in the axial direction. The mounting shaft 43 protrudes outward in the axial direction from one axial end of the main shaft 42, and the coupling shaft 44 protrudes outward in the axial direction from the other axial end of the main shaft 42. In the cylinder device 11, for example, the mounting shaft 43 of the rod 41 is mounted to a vehicle body side, and the outer cylinder 14 of the cylinder 15 is mounted to a wheel side.

The main shaft 42 has a main outer peripheral portion 51 of which the outer peripheral surface has a cylindrical shape. An outer peripheral portion of the main shaft 42 is mainly formed of the main outer peripheral portion 51, and a tapered portion 52 of which the outer peripheral surface is a tapered surface is formed in an axial end portion on a coupling shaft 44 side of the main shaft 42. In the main shaft 42, one end portion 53 that is an axial end portion on a mounting shaft 43 side has an end surface that is widened in a direction orthogonal to an axis, and the other end portion 55 that is an axial end portion on a coupling shaft 44 side has an end surface that is widened in the direction orthogonal to the axis.

A male screw 57 is formed in an outer peripheral portion of the mounting shaft 43. A tip portion 59 that is an end portion on an opposite side of the mounting shaft 43 from the main shaft 42 in the axial direction has a flat tip surface that is widened in a direction orthogonal to an axis.

An outer peripheral portion on a main shaft 42 side in the axial direction of the coupling shaft 44 is a fitting outer peripheral portion 62 of which the outer peripheral surface has a cylindrical shape with a constant diameter, and an outer peripheral portion on an opposite side of the coupling shaft 44 from the main shaft 42 in the axial direction is a male screw 65. A tip portion 68 that is an end portion on an opposite side of the coupling shaft 44 from the main shaft 42 in the axial direction has a flat tip surface that is widened in a direction orthogonal to an axis.

The piston 35 is coupled to the rod 41 by a nut 71. Namely, the piston 35 is fitted to the fitting outer peripheral portion 62 of the coupling shaft 44 of the rod 41 and the nut 71 is screwed onto the male screw 65 of the coupling shaft 44, thereby the piston 35 is mounted to the rod 41.

The rod 41 extends outside from the cylinder 15 through the rod guide 31 and the seal member 33 that are provided on the opening portion 23 side of the cylinder 15. The main shaft 42 of the rod 41 is in sliding contact with the rod guide 31 and the seal member 33 through the main outer peripheral portion 51. In other words, the rod guide 31 and the seal member 33 that are provided in the opening portion 23 of the cylinder 15 are in sliding contact with the main outer peripheral portion 51 of the rod 41.

Here, only the main outer peripheral portion 51 of the main shaft 42 of the rod 41 is in sliding contact with the rod guide 31 and the seal member 33. Therefore, the mounting shaft 43 of the rod 41 does neither come into sliding contact with the rod guide 31 nor come into sliding contact with the seal member 33. The coupling shaft 44 of the rod 41 does neither come into sliding contact with the rod guide 31 nor come into sliding contact with the seal member 33.

The rod 41 is guided by the rod guide 31 to move integrally with the piston 35 in the axial direction relative to the cylinder 15. The seal member 33 closes a gap between the outer cylinder 14 and the rod 41 to restrict the working liquid in the inner cylinder 12 and the working gas and the working liquid in the reservoir chamber 13 from leaking outside. Therefore, the seal member 33 is provided in the opening portion 23 of the cylinder 15 to seal the working fluid sealed in the cylinder 15.

The piston 35 is provided with a passage 74 and a passage 75 penetrating therethrough in the axial direction. The passages 74 and 75 can communicate with the first chamber 38 and the second chamber 39. The cylinder device 11 includes a disk valve 76, which has an annular shape and comes into contact with the piston 35 to be able to close the passage 74, on an opposite side of the piston 35 from the bottom portion 22 in the axial direction. In addition, the cylinder device 11 includes a disk valve 77, which has an annular shape and comes into contact with the piston 35 to be able to close the passage 75, on a bottom portion 22 side in the axial direction of the piston 35.

When the rod 41 moves to a contraction side to increase the amount of advance of the rod 41 into the cylinder 15 and the piston 35 moves in a direction to reduce the volume of the second chamber 39, to cause the pressure of the second chamber 39 to become higher by a predetermined value or more than the pressure of the first chamber 38, the disk valve 76 opens the passage 74, so that a damping force is generated at that time. When the rod 41 moves to an extension side to increase the amount of protrusion of the rod 41 from the cylinder 15 and the piston 35 moves in a direction to reduce the volume of the first chamber 38, to cause the pressure of the first chamber 38 to become higher by a predetermined value or more than the pressure of the second chamber 39, the disk valve 77 opens the passage 75, so that a damping force is generated at that time.

The base member 30 is provided with a passage 82 and a passage 83 penetrating therethrough in the axial direction. The passages 82 and 83 can communicate with the second chamber 39 and the reservoir chamber 13. The cylinder device 11 includes a disk valve 85, which has an annular shape and comes into contact with the base member 30 to be able to close the passage 82, on a bottom portion 22 side in the axial direction of the base member 30, and a disk valve 86, which has an annular shape and comes into contact with the base member 30 to be able to close the passage 83, on an opposite side of the base member 30 from the bottom portion 22 in the axial direction.

When the rod 41 moves to the contraction side and the piston 35 moves in the direction to reduce the volume of the second chamber 39 to cause the pressure of the second chamber 39 to become higher by a predetermined value or more than the pressure of the reservoir chamber 13, the disk valve 85 opens the passage 82, so that a damping force is generated at that time. When the rod 41 moves to the extension side and the piston 35 moves to a first chamber 38 side to cause the pressure of the second chamber 39 to become lower than the pressure of the reservoir chamber 13, the disk valve opens the passage 83. At that time, the disk valve 86 allows the working liquid to flow from the reservoir chamber 13 into the second chamber 39 substantially without generating a damping force. That is, the disk valve 86 is a suction valve.

Next, a method for producing the rod 41 to be provided in the cylinder device 11 of the present embodiment will be described.

Figure 2:
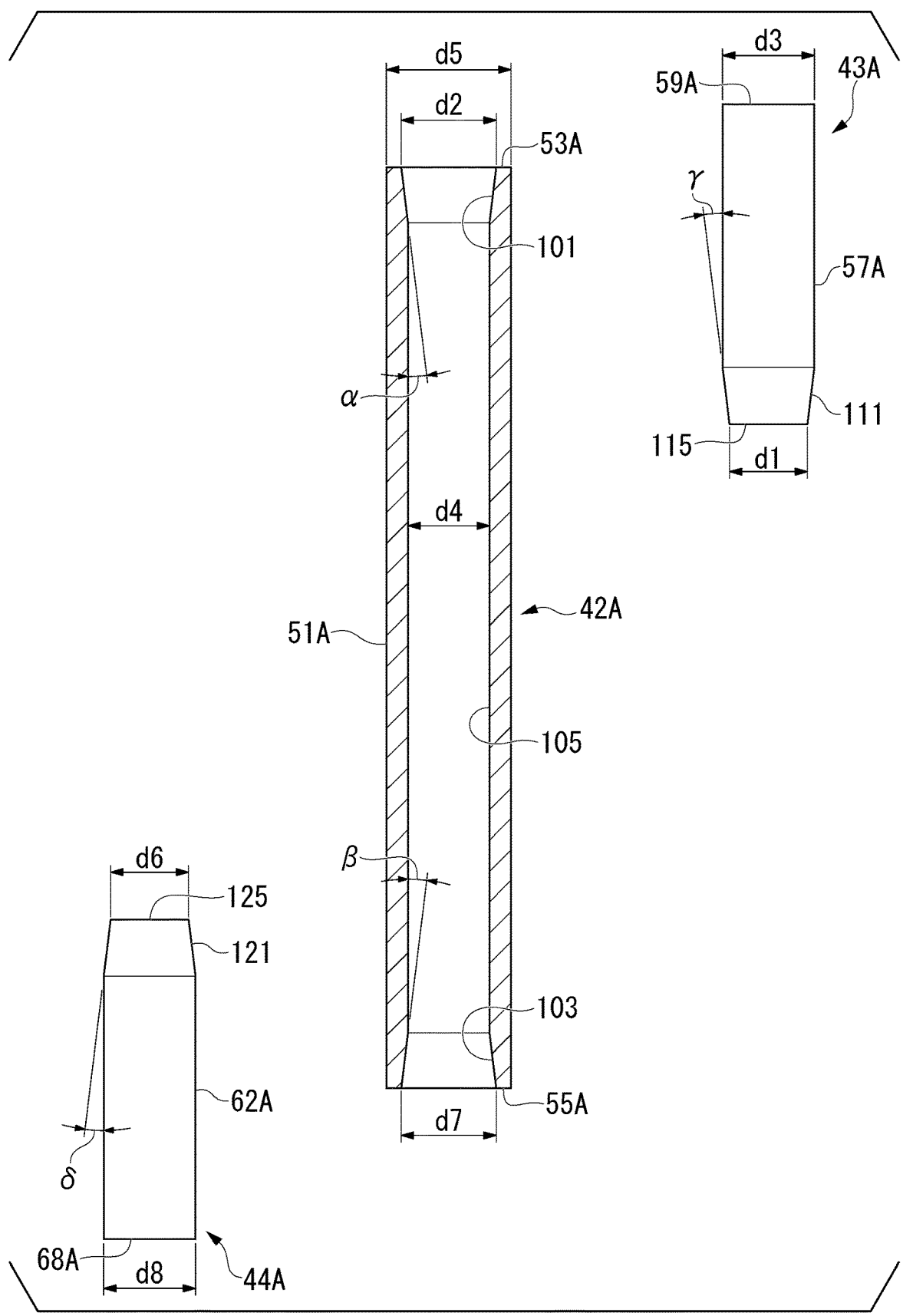
FIG. 2 is an exploded view of a rod before joining in the cylinder device according to one embodiment of the invention.

In the rod 41, the main shaft 42 illustrated in FIG. 1 is made of a main shaft forming member 42A (first member) illustrated in FIG. 2, the mounting shaft 43 illustrated in FIG. 1 is made of a mounting shaft forming member 43A (second member) illustrated in FIG. 2, and the coupling shaft 44 illustrated in FIG. 1 is made of a coupling shaft forming member 44A (second member) illustrated in FIG. 2. The main shaft forming member 42A, the mounting shaft forming member 43A, and the coupling shaft forming member 44A are separate components and are integrated by weld joining using friction generated by pressure contact. Incidentally, the present embodiment illustrates an example where both of the mounting shaft forming member 43A and the coupling shaft forming member 44A are integrated with the main shaft forming member 42A by friction weld joining; however, the technique of the present embodiment may be applied to only either one of the mounting shaft forming member 43A and the coupling shaft forming member 44A.

The main shaft forming member 42A is a cylindrical pipe and is hollow over the overall length thereof in the axial direction. The mounting shaft forming member 43A is joined to one axial end portion of an inner peripheral portion of the main shaft forming member 42A. The one axial end portion of the inner peripheral portion of the main shaft forming member 42A is one end conical hole portion 101 (conical hole portion), the one axial end portion to which the mounting shaft forming member 43A is joined. The one end conical hole portion 101 has a tapered inner peripheral surface of which the diameter is increased as the tapered inner peripheral surface approaches the outside in the axial direction. In other words, when an axis that passes through the center of an inner peripheral surface of the main shaft forming member 42A in a cross section perpendicular to a longitudinal direction of the main shaft forming member 42A and is parallel to the longitudinal direction of the main shaft forming member 42A is a reference axis, the maximum value of the radius with respect to the reference axis, the radius being in a predetermined region range in a reference axis direction which includes one end portion of one end portion 53A and the other end portion 55A that are a pair of end portions of the main shaft forming member 42A and being provided on an inner peripheral side of the main shaft forming member 42A, is larger than the radius of a main outer peripheral portion 51A with reference to the reference axis. Furthermore, an angle α of the one end conical hole portion 101 relative to a central axis of the main shaft forming member 42A is 3° to 8°.

The coupling shaft forming member 44A is joined to the other axial end portion of the inner peripheral portion of the main shaft forming member 42A. The other axial end portion of the inner peripheral portion of the main shaft forming member 42A is the other end conical hole portion 103 (conical hole portion), the other axial end portion to which the coupling shaft forming member 44A is joined. The other end conical hole portion 103 has a tapered inner peripheral surface of which the diameter is increased as the tapered inner peripheral surface approaches the outside in the axial direction. An angle β of the other end conical hole portion 103 relative to the central axis of the main shaft forming member 42A is 3° to 8°.

A portion of the main shaft forming member 42A between the one end conical hole portion 101 and the other end conical hole portion 103 is an intermediate hole portion 105 having a cylindrical inner peripheral surface with a constant diameter. In addition, the one end portion 53A at one axial end of the main shaft forming member 42A has a flat end surface that is widened in a direction orthogonal to an axis, and the other end portion 55A at the other axial end thereof has a flat end surface that is widened in the direction orthogonal to the axis. In addition, the main outer peripheral portion 51A that is an outer peripheral portion of the main shaft forming member 42A has a cylindrical outer peripheral surface with a constant diameter.

The main outer peripheral portion 51A of the main shaft forming member 42A is to be machined later to become the main outer peripheral portion 51 of the main shaft 42, the main outer peripheral portion 51 being in sliding contact with the rod guide 31 of the rod 41 and the seal member 33 illustrated in FIG. 1. Therefore, the main shaft forming member 42A becomes a portion that is in sliding contact with the rod guide 31 of the rod 41 and the seal member 33 later. In addition, the one end portion 53A of the main shaft forming member 42A is to be machined later to become the one end portion 53 of the main shaft 42 of the rod 41 illustrated in FIG. 1, and the other end portion SSA thereof is to be machined later to become the tapered portion 52 and the other end portion 55 of the main shaft 42.

The mounting shaft forming member 43A is a columnar member and is solid over the overall length thereof in the axial direction. An outer peripheral portion at one axial end of the mounting shaft forming member 43A, the outer peripheral portion to be joined to the main shaft forming member 42A, is a conical outer peripheral portion 111. The conical outer peripheral portion 111 has a tapered outer peripheral surface of which the diameter is decreased as the tapered outer peripheral surface approaches the outside in the axial direction. An angle γ of the conical outer peripheral portion 111 relative to a central axis of the mounting shaft forming member 43A is 3° to 8°.

In addition, an outer peripheral portion other than the conical outer peripheral portion 111 in the mounting shaft forming member 43A is a columnar outer peripheral portion 57A having a cylindrical outer peripheral surface with a constant diameter. In addition, in the mounting shaft forming member 43A, an end portion 115 on an opposite side of the conical outer peripheral portion 111 from the columnar outer peripheral portion 57A has a flat end surface that is widened in a direction orthogonal to an axis, and an end portion 59A on an opposite side of the columnar outer peripheral portion 57A from the conical outer peripheral portion 111 has a flat end surface that is widened in the direction orthogonal to the axis.

A minimum outer diameter d1 of the conical outer peripheral portion 111 of the mounting shaft forming member 43A is smaller than a maximum inner diameter d2 of the one end conical hole portion 101 of the main shaft forming member 42A. Accordingly, the conical outer peripheral portion 111 can enter the one end conical hole portion 101. In addition, a maximum outer diameter d3 of the conical outer peripheral portion 111 of the mounting shaft forming member 43A, namely, an outer diameter d3 of the columnar outer peripheral portion 57A is larger than a minimum inner diameter d4 of the one end conical hole portion 101 of the main shaft forming member 42A, namely, an inner diameter d4 of the intermediate hole portion 105. Accordingly, when the conical outer peripheral portion 111 enters the one end conical hole portion 101, the conical outer peripheral portion 111 comes into contact with the one end conical hole portion 101 to be restricted from entering beyond the contact location.

In addition, the maximum outer diameter d3 of the conical outer peripheral portion 111 of the mounting shaft forming member 43A, namely, the outer diameter d3 of the columnar outer peripheral portion 57A is smaller than an outer diameter d5 of the main shaft forming member 42A, namely, the outer diameter d5 of the main outer peripheral portion 51A. As described above, the mounting shaft forming member 43A is formed to have the columnar outer peripheral portion 57A having the outer diameter d3 smaller than the outer diameter d5 of the main shaft forming member 42A, and the conical outer peripheral portion 111 having an outer diameter smaller than the outer diameter d5 of the main shaft forming member 42A, namely, an outer diameter that is equal to or larger than d1 and is equal to or less than d3.

The columnar outer peripheral portion 57A of the mounting shaft forming member 43A is to be machined later to become the male screw 57 of the mounting shaft 43 which does not come into sliding contact with the rod guide 31 of the rod 41 and the seal member 33 illustrated in FIG. 1.

Therefore, the mounting shaft forming member 43A becomes a portion that does not come into sliding contact with the rod guide 31 of the rod 41 and the seal member 33 later. In addition, the end portion 59A of the mounting shaft forming member 43A is to be machined later to become the tip portion 59 of the mounting shaft 43 of the rod 41.

Here, the angle γ of the conical outer peripheral portion 111 with respect to the central axis of the mounting shaft forming member 43A is equal to the angle α of the one end conical hole portion 101 with respect to the central axis of the main shaft forming member 42A, and the length in an axial direction of the conical outer peripheral portion 111 is equal to the length in an axial direction of the one end conical hole portion 101. The maximum outer diameter d3 of the conical outer peripheral portion 111 is larger by a predetermined amount than the maximum inner diameter d2 of the one end conical hole portion 101. In other words, the dimensional relationship is set such that the conical outer peripheral portion 111 protrudes outward by a predetermined amount (for example, 1 mm) from the one end portion 53A when the mounting shaft forming member 43A is inserted into the main shaft forming member 42A until the conical outer peripheral portion 111 comes into contact with the one end conical hole portion 101 to be stopped.

The coupling shaft forming member 44A is a columnar member and is solid over the overall length thereof in the axial direction. An outer peripheral portion at one axial end of the coupling shaft forming member 44A, the outer peripheral portion to be joined to the main shaft forming member 42A, is a conical outer peripheral portion 121. The conical outer peripheral portion 121 has a tapered outer peripheral surface of which the diameter is decreased as the tapered outer peripheral surface approaches the outside in the axial direction. An angle δ of the conical outer peripheral portion 121 with respect to a central axis of the coupling shaft forming member 44A is 3° to 8°.

In addition, an outer peripheral portion other than the conical outer peripheral portion 121 in the coupling shaft forming member 44A is a columnar outer peripheral portion 62A having a cylindrical outer peripheral surface with a constant diameter. In addition, in the coupling shaft forming member 44A, an end portion 125 on an opposite side of the conical outer peripheral portion 121 from the columnar outer peripheral portion 62A has a flat end surface that is widened in a direction orthogonal to an axis, and an end portion 68A on an opposite side of the columnar outer peripheral portion 62A from the conical outer peripheral portion 121 has a flat end surface that is widened in the direction orthogonal to the axis.

A minimum outer diameter d6 of the conical outer peripheral portion 121 of the coupling shaft forming member 44A is smaller than a maximum inner diameter d7 of the other end conical hole portion 103 of the main shaft forming member 42A.

Accordingly, the conical outer peripheral portion 121 can enter the other end conical hole portion 103. In addition, a maximum outer diameter d8 of the conical outer peripheral portion 121 of the coupling shaft forming member 44A, namely, an outer diameter d8 of the columnar outer peripheral portion 62A is larger than the minimum inner diameter d4 of the other end conical hole portion 103 of the main shaft forming member 42A, namely, the inner diameter d4 of the intermediate hole portion 105. Accordingly, when the conical outer peripheral portion 121 enters the other end conical hole portion 103, the conical outer peripheral portion 121 comes into contact with the other end conical hole portion 103 to be restricted from entering beyond the contact location.

In addition, the maximum outer diameter d8 of the conical outer peripheral portion 121 of the coupling shaft forming member 44A, namely, the outer diameter d8 of the columnar outer peripheral portion 62A is smaller than the outer diameter d5 of the main shaft forming member 42A, namely, the outer diameter d5 of the main outer peripheral portion 51A. As described above, the coupling shaft forming member 44A is formed to have the columnar outer peripheral portion 62A having the outer diameter d8 smaller than the outer diameter d5 of the main shaft forming member 42A, and the conical outer peripheral portion 121 having an outer diameter smaller than the outer diameter d5 of the main shaft forming member 42A, namely, an outer diameter that is equal to or larger than d6 and is equal to or less than d8.

The columnar outer peripheral portion 62A of the coupling shaft forming member 44A is to be machined later to become the fitting outer peripheral portion 62 and the male screw 65 of the coupling shaft 44 which does not come into sliding contact with the rod guide 31 of the rod 41 and the seal member 33 illustrated in FIG. 1. Therefore, the coupling shaft forming member 44A becomes a portion that does not come into sliding contact with the rod guide 31 of the rod 41 and the seal member 33 later. In addition, the end portion 68A of the coupling shaft forming member 44A is to be machined later to become the tip portion 68 of the coupling shaft 44 of the rod 41.

Here, the angle δ of the conical outer peripheral portion 121 with respect to the central axis of the coupling shaft forming member 44A is equal to the angle β of the other end conical hole portion 103 with respect to the central axis of the main shaft forming member 42A, and the length in an axial direction of the conical outer peripheral portion 121 is equal to the length in an axial direction of the other end conical hole portion 103. The maximum outer diameter d8 of the conical outer peripheral portion 121 is larger by a predetermined amount than the maximum inner diameter d7 of the other end conical hole portion 103. In other words, the dimensional relationship is set such that the conical outer peripheral portion 121 protrudes outward by a predetermined amount (for example, 1 mm) from the other end portion 55A when the coupling shaft forming member 44A is inserted into the main shaft forming member 42A until the conical outer peripheral portion 121 comes into contact with the other end conical hole portion 103 to be stopped.

Figure 3:
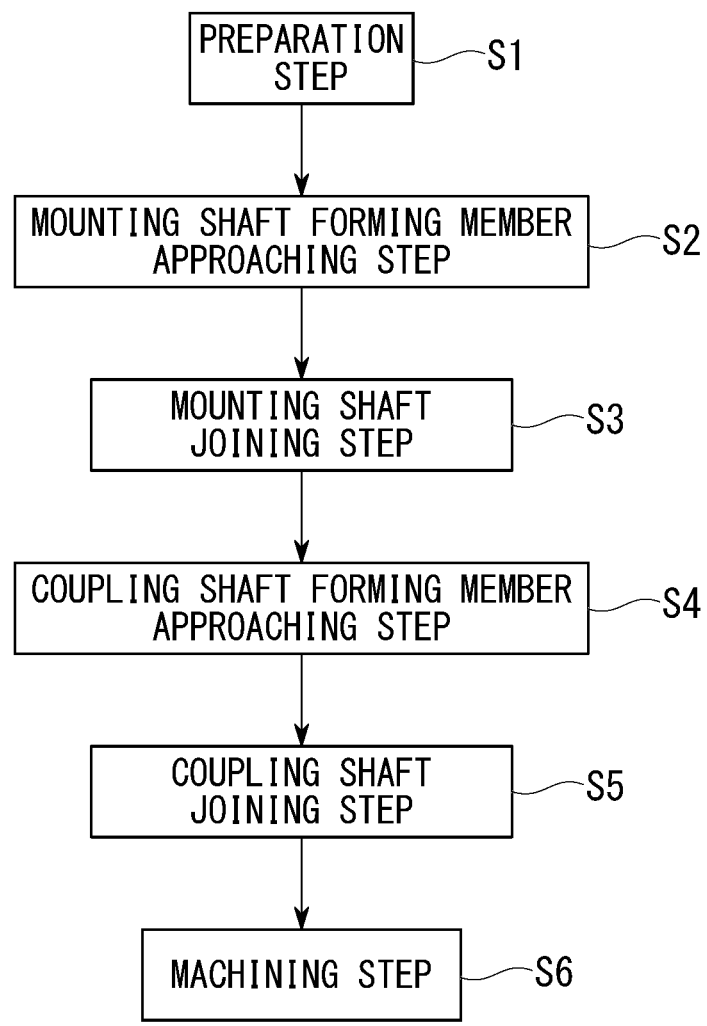
FIG. 3 is a flowchart illustrating a method for producing a rod according to one embodiment of the invention.

The method for producing the rod 41 in the present embodiment includes a preparation step S1 illustrated in FIG. 3 of preparing the main shaft forming member 42A, the mounting shaft forming member 43A, and the coupling shaft forming member 44A.

Figure 4:
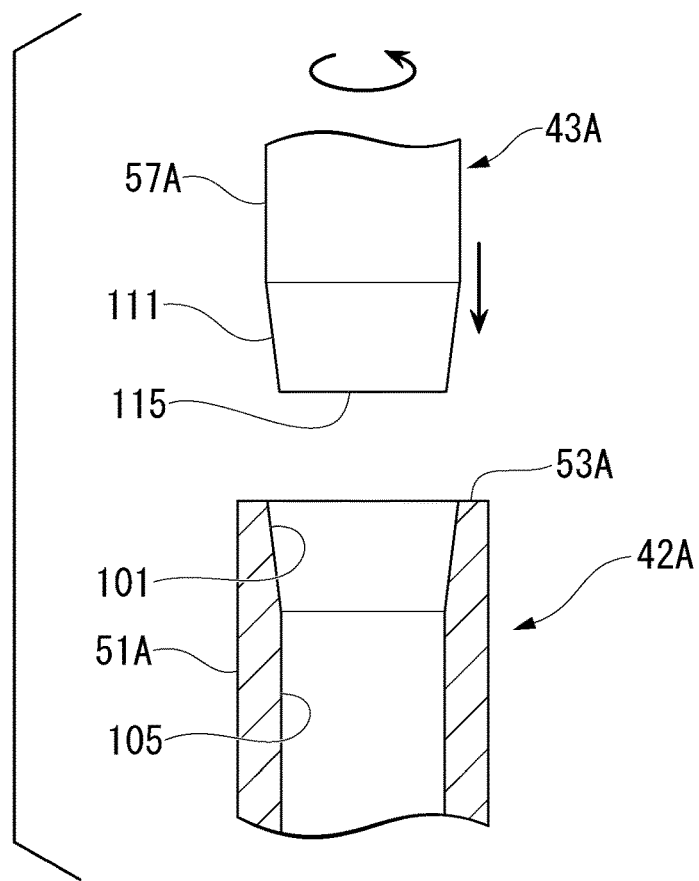
FIG. 4 is a sectional view illustrating a mounting shaft forming member approaching step in the method for producing a rod according to one embodiment of the invention.

In the production method of the present embodiment, after the preparation step S1, a mounting shaft forming member approaching step S2 illustrated in FIG. 3 is performed in which the main shaft forming member 42A is fixed to a friction welding machine and while the mounting shaft forming member 43A is rotated as illustrated in FIG. 4 by the friction welding machine, the inner peripheral surface of the one end conical hole portion 101 of the main shaft forming member 42A and an outer peripheral surface of the conical outer peripheral portion 111 of the mounting shaft forming member 43A are caused to approach each other. Incidentally, the present embodiment illustrates the method by which while the mounting shaft forming member 43A is rotated, the mounting shaft forming member 43A is caused to approach the main shaft forming member 42A; however, while the main shaft forming member 42A is rotated, the main shaft forming member 42A may be caused to approach the mounting shaft forming member 43A.

Figure 5:
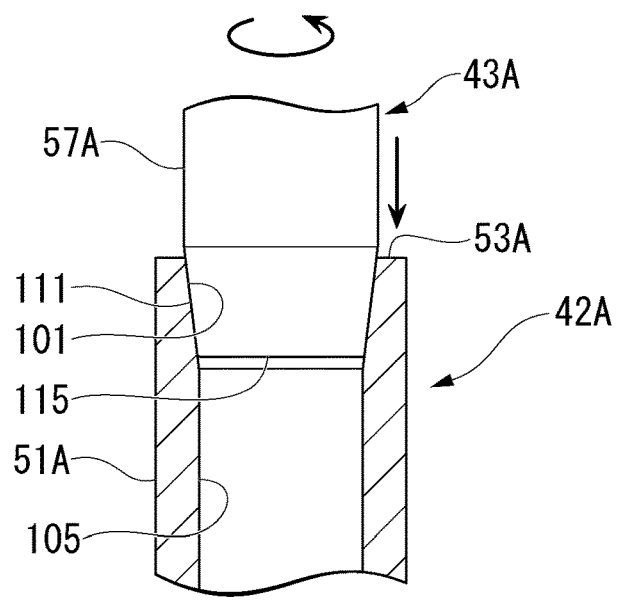
FIG. 5 is a sectional view illustrating the mounting shaft forming member approaching step in the method for producing a rod according to one embodiment of the invention.

In the production method of the present embodiment, after the inner peripheral surface of the one end conical hole portion 101 of the main shaft forming member 42A and the outer peripheral surface of the conical outer peripheral portion 111 of the mounting shaft forming member 43A are brought into contact with each other as illustrated in FIG. 5 by the mounting shaft forming member approaching step S2 performed by the friction welding machine, a mounting shaft joining step S3 illustrated in FIG. 3 is performed in which while the state of rotation of the mounting shaft forming member 43A is maintained, the main shaft forming member 42A and the mounting shaft forming member 43A are pushed in relative to each other by a predetermined amount in the axial direction to bring the main shaft forming member 42A and the mounting shaft forming member 43A into pressure contact with each other, and the main shaft forming member 42A and the mounting shaft forming member 43A are joined by weld joining using frictional heat generated at that time.

Here, while rotating the mounting shaft forming member 43A, the friction welding machine pushes the mounting shaft forming member 43A into the main shaft forming member 42A that is fixed. As illustrated in FIG. 5, when the conical outer peripheral portion 111 comes into contact with the one end conical hole portion 101, the conical outer peripheral portion 111 protrudes outward by a predetermined amount (for example, 1 mm) from the one end portion 53A, and in the mounting shaft joining step S3, the predetermined amount is used as a push-in amount and the mounting shaft forming member 43A is pushed into the main shaft forming member 42A by the push-in amount in the axial direction. Immediately after the mounting shaft forming member 43A is pushed in by the push-in amount, the rotation of the mounting shaft forming member 43A is stopped and the mounting shaft forming member 43A is held in that state for a certain amount of time.

Figure 6:
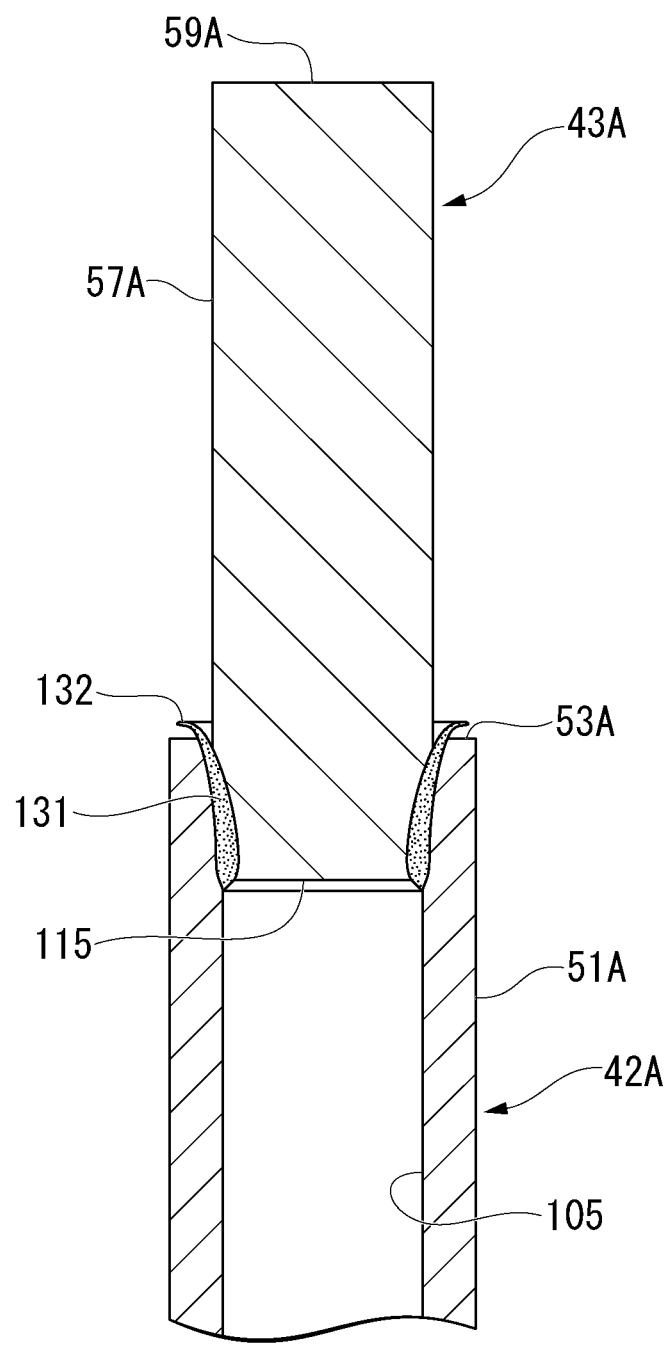
FIG. 6 is a sectional view illustrating a state after a mounting shaft joining step in the method for producing a rod according to one embodiment of the invention.

Then, the material of the inner peripheral portion of the one end conical hole portion 101 of the main shaft forming member 42A and the material of the outer peripheral portion of the conical outer peripheral portion 111 of the mounting shaft forming member 43A are softened and stirred by frictional heat and then are solidified and integrated to form a welded portion 131 as illustrated in FIG. 6. The welded portion 131 is formed between the inner peripheral portion of the main shaft forming member 42A and the outer peripheral portion of the mounting shaft forming member 43A. The welded portion 131 has a shape substantially following the shape of the one end conical hole portion 101 and the conical outer peripheral portion 111 illustrated in FIG. 5, and has a cylindrical shape that is extended toward the one end portion 53A of the main shaft forming member 42A. The welded portion 131 includes a burr 132 that protrudes outward from the one end portion 53A of the main shaft forming member 42A in the axial direction and protrudes outward from the columnar outer peripheral portion 57A of the mounting shaft forming member 43A in the radial direction.

Figure 7:
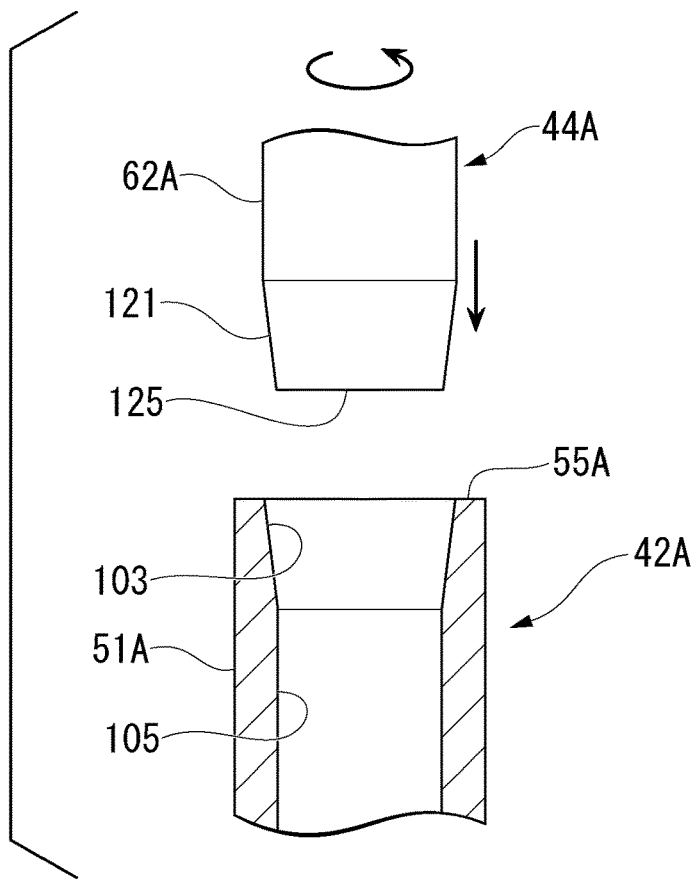
FIG. 7 is a sectional view illustrating a coupling shaft forming member approaching step in the method for producing a rod according to one embodiment of the invention.

In the production method of the present embodiment, after the mounting shaft joining step S3, a coupling shaft forming member approaching step S4 illustrated in FIG. 3 is performed in which the main shaft forming member 42A is fixed to the friction welding machine and while the coupling shaft forming member 44A is rotated as illustrated in FIG. 7 by the friction welding machine, the inner peripheral surface of the other end conical hole portion 103 of the main shaft forming member 42A and an outer peripheral surface of the conical outer peripheral portion 121 of the coupling shaft forming member 44A are caused to approach each other.

Figure 8:
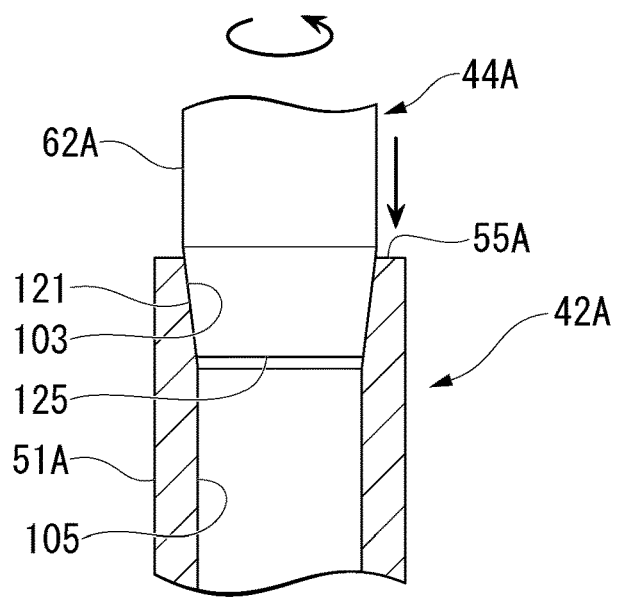
FIG. 8 is a sectional view illustrating the coupling shaft forming member approaching step in the method for producing a rod according to one embodiment of the invention.

In the production method of the present embodiment, after the inner peripheral surface of the other end conical hole portion 103 of the main shaft forming member 42A and the outer peripheral surface of the conical outer peripheral portion 121 of the coupling shaft forming member 44A are brought into contact with each other as illustrated in FIG. 8 by the coupling shaft forming member approaching step S4 performed by the friction welding machine, a coupling shaft joining step S5 illustrated in FIG. 3 is performed in which while the state of rotation of the coupling shaft forming member 44A is maintained, the main shaft forming member 42A and the coupling shaft forming member 44A are pushed in relative to each other by a predetermined amount in the axial direction to bring the main shaft forming member 42A and the coupling shaft forming member 44A into pressure contact with each other, and the main shaft forming member 42A and the coupling shaft forming member 44A are joined by weld joining using frictional heat generated at that time.

Here, while rotating the coupling shaft forming member 44A, the friction welding machine pushes the coupling shaft forming member 44A into the main shaft forming member 42A that is fixed. As illustrated in FIG. 8, when the conical outer peripheral portion 121 comes into contact with the other end conical hole portion 103, the conical outer peripheral portion 121 protrudes outward by a predetermined amount (for example, 1 mm) from the other end portion 55A, and in the coupling shaft joining step S5, the predetermined amount is used as a push-in amount and the coupling shaft forming member 44A is pushed into the main shaft forming member 42A by the push-in amount in the axial direction. Immediately after the coupling shaft forming member 44A is pushed in by the push-in amount, the rotation of the coupling shaft forming member 44A is stopped and the coupling shaft forming member 44A is held in that state for a certain amount of time.

Figure 9:
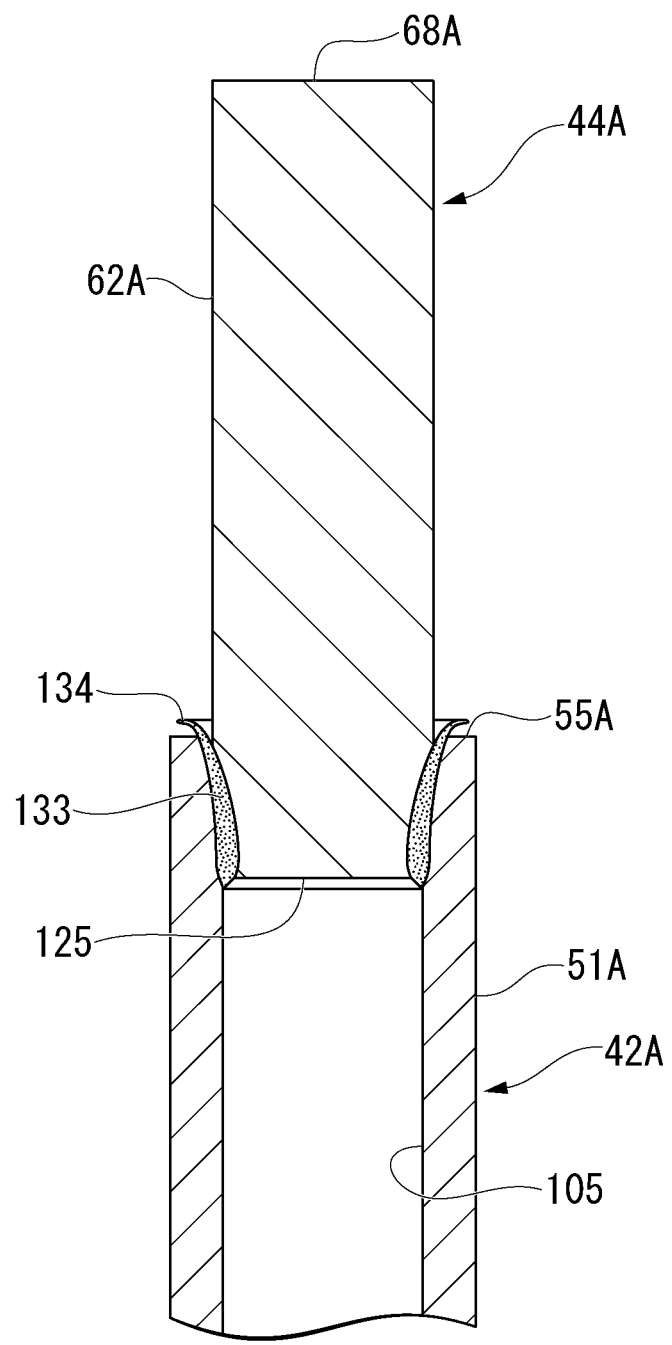
FIG. 9 is a sectional view illustrating a state after a coupling shaft joining step in the method for producing a rod according to one embodiment of the invention.

Then, the material of the inner peripheral portion of the other end conical hole portion 103 of the main shaft forming member 42A and the material of the outer peripheral portion of the conical outer peripheral portion 121 of the coupling shaft forming member 44A are softened and stirred by frictional heat and then are solidified and integrated to form a welded portion 133 as illustrated in FIG. 9. The welded portion 133 is formed between the inner peripheral portion of the main shaft forming member 42A and the outer peripheral portion of the coupling shaft forming member 44A. The welded portion 133 has a shape substantially following the shape of the other end conical hole portion 103 and the conical outer peripheral portion 121 illustrated in FIG. 8, and has a cylindrical shape that is extended toward the other end portion 55A of the main shaft forming member 42A. The welded portion 133 includes a burr 134 that protrudes outward from the other end portion 55A of the main shaft forming member 42A in the axial direction and protrudes outward from the columnar outer peripheral portion 62A of the coupling shaft forming member 44A in the radial direction.

In the production method of the present embodiment, as illustrated in FIG. 3, after the coupling shaft joining step S5, a machining step S6 is performed. In the machining step S6, one side tip portion forming step is performed in which the end portion 59A of the mounting shaft forming member 43A illustrated in FIG. 6 is machined to form the tip portion 59 of the mounting shaft 43 illustrated in FIG. 10. In addition, in the machining step S6, a main shaft-one end portion forming step is performed in which the one end portion 53A of the main shaft forming member 42A illustrated in FIG. 6 is machined to form the one end portion 53 of the main shaft 42 illustrated in FIG. 10. In addition, in the machining step S6, a male screw forming step is performed in which the columnar outer peripheral portion 57A of the mounting shaft forming member 43A illustrated in FIG. 6 is machined to form the male screw 57 of the mounting shaft 43 illustrated in FIG. 10.

Figure 10:
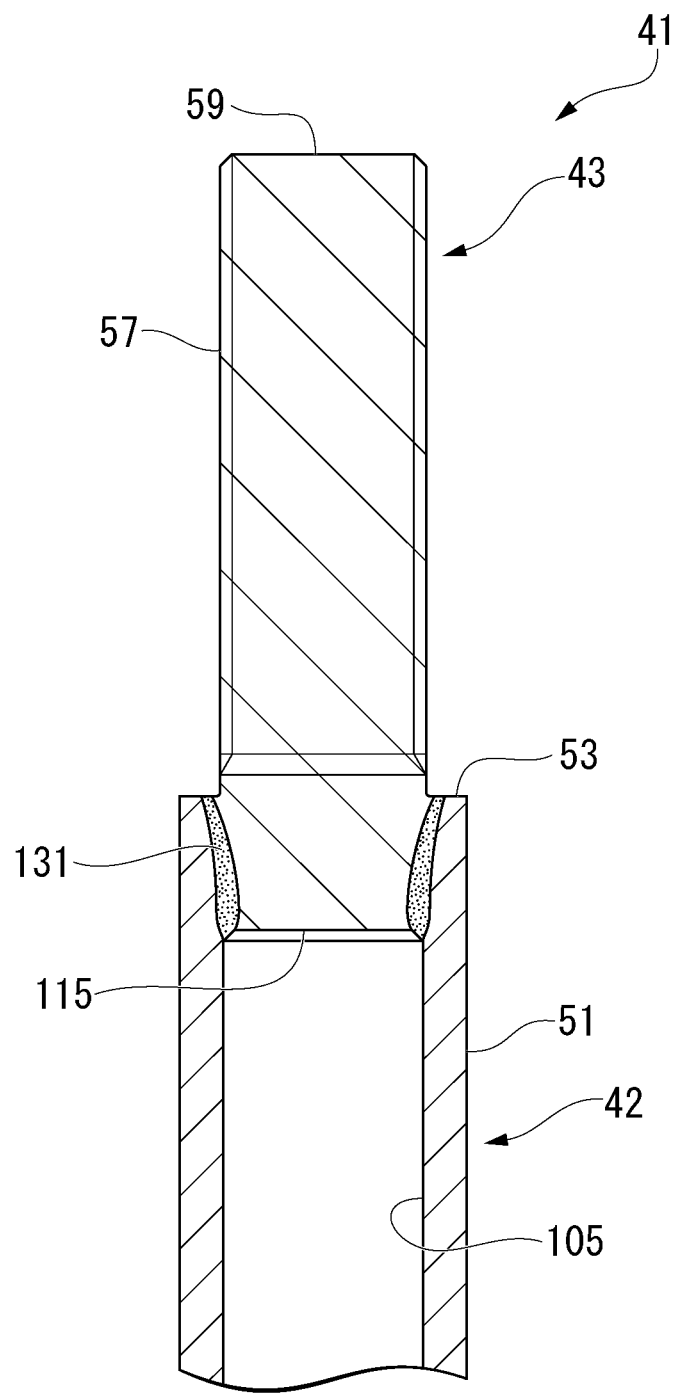
FIG. 10 is a sectional view illustrating one end side of the rod of the cylinder device according to one embodiment of the invention.

Here, in the mounting shaft joining step S3, as illustrated in FIG. 6, even if metal melted between the one end portion 53A of the main shaft forming member 42A and the columnar outer peripheral portion 57A of the mounting shaft forming member 43A protrudes outward and is solidified to generate the burr 132, as illustrated in FIG. 10, the burr 132 can be cut and removed by the main shaft-one end portion forming step and the male screw forming step of the machining step S6. Namely, the production method of the present embodiment includes the male screw forming step of forming a screw in a portion of the mounting shaft forming member 43A other than the welded portion 131 between the mounting shaft forming member 43A and the main shaft forming member 42A and removing the burr 132 of the welded portion 131 at that time. Incidentally, in the male screw forming step, a base portion of the male screw 57 may be formed by cutting to form the male screw 57 by rolling. In that case, the burr 132 is removed when the base portion of the male screw 57 is cut.

Figure 11:
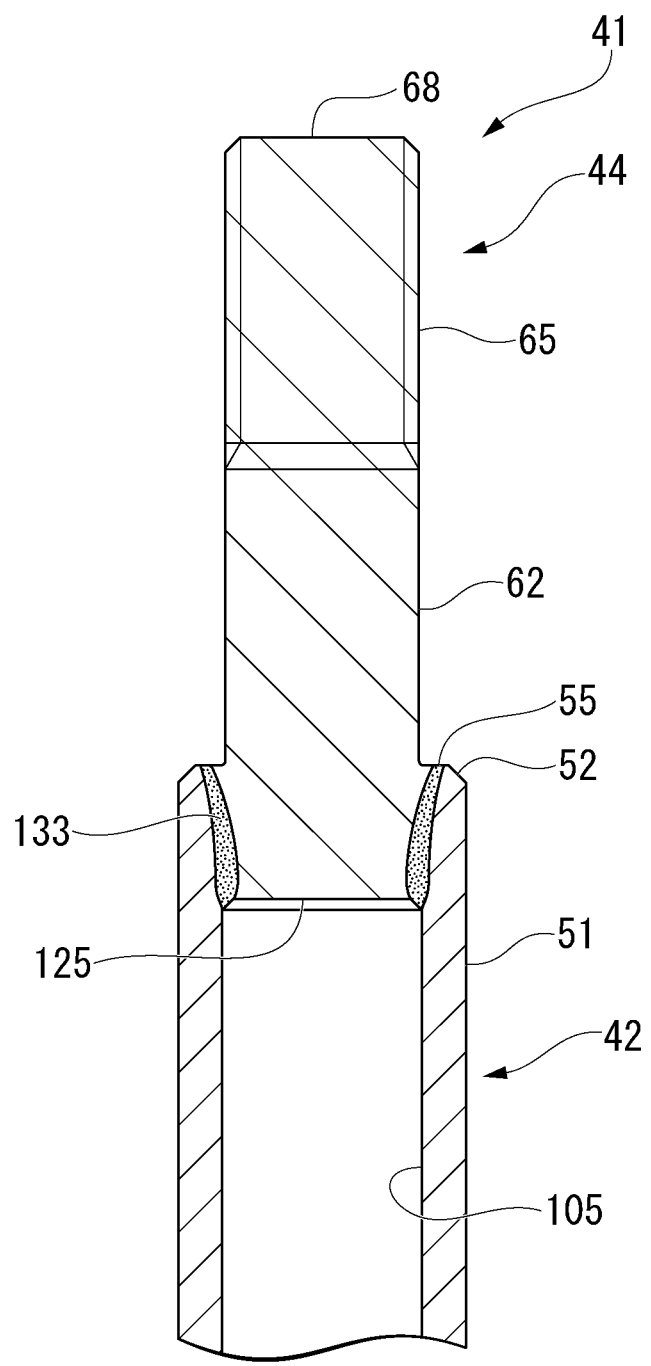
FIG. 11 is a sectional view illustrating the other end side of the rod of the cylinder device according to one embodiment of the invention.

In addition, in the machining step S6, the other side tip portion forming step is performed in which the end portion 68A of the coupling shaft forming member 44A illustrated in FIG. 9 is machined to form the tip portion 68 of the coupling shaft 44 illustrated in FIG. 11. In addition, in the machining step S6, a main shaft—the other end portion forming step is performed in which the other end portion 55A of the main shaft forming member 42A illustrated in FIG. 9 is machined to form the tapered portion 52 and the other end portion 55 of the main shaft 42 illustrated in FIG. 11. In addition, in the machining step S6, a male screw and the like forming step is performed in which the columnar outer peripheral portion 62A of the coupling shaft forming member 44A illustrated in FIG. 9 is machined to form the fitting outer peripheral portion 62 and the male screw 65 of the coupling shaft 44 illustrated in FIG. 11.

Here, in the coupling shaft joining step S5, as illustrated in FIG. 9, even if metal melted between the other end portion 55A of the main shaft forming member 42A and the columnar outer peripheral portion 62A of the coupling shaft forming member 44A protrudes outward and is solidified to generate the burr 134, as illustrated in FIG. 11, the burr 134 can be cut and removed by the main shaft—the other end portion forming step and the male screw and the like forming step of the machining step S6. Namely, the production method of the present embodiment includes the male screw and the like forming step of forming a screw in a portion of the coupling shaft forming member 44A other than the welded portion 133 between the coupling shaft forming member 44A and the main shaft forming member 42A and removing the burr 134 of the welded portion 133 at that time. Incidentally, in the male screw and the like forming step, the fitting outer peripheral portion 62 and a base portion of the male screw 65 may be formed by cutting to form the male screw 65 by rolling. In that case, the burr 134 is removed when the fitting outer peripheral portion 62 and the base portion of the male screw 65 are cut.

As illustrated in FIG. 1, the rod 41 produced by the above production method of the present embodiment has the main shaft 42 that is in sliding contact with the rod guide 31 and the seal member 33, and the mounting shaft 43 and the coupling shaft 44 of which both do not come into sliding contact with the rod guide 31 and the seal member 33. A portion of the main shaft 42, the mounting shaft 43 and the coupling shaft 44 entering the portion, is solid and the other portion is hollow. Both of the mounting shaft 43 and the coupling shaft 44 are solid. In the rod 41, the outer diameters of both of the mounting shaft 43 and the coupling shaft 44 are smaller over the overall lengths thereof than the outer diameter of the main shaft 42.

Then, in the rod 41, as illustrated in FIG. 10, the inner peripheral portion of the main shaft 42 and the outer peripheral portion of the mounting shaft 43 are joined by friction weld joining. The welded portion 131 formed at that time between the inner peripheral portion of the main shaft 42 and the outer peripheral portion of the mounting shaft 43 has a cylindrical shape of which the diameter is widened as the welded portion 131 approaches the one end portion 53 of the main shaft 42. Then, in the rod 41, as illustrated in FIG. 11, the inner peripheral portion of the main shaft 42 and the outer peripheral portion of the coupling shaft 44 are joined by friction weld joining. The welded portion 133 formed at that time between the inner peripheral portion of the main shaft 42 and the outer peripheral portion of the coupling shaft 44 has a cylindrical shape of which the diameter is widened as the welded portion 133 approaches the other end portion 55 of the main shaft 42.

The Patent Literature 1 describes a production method for friction-welding a cylindrical member and a mixed member having a cylindrical portion and a columnar portion to produce a rod. In the production method, the cylindrical member is fixed and while the mixed member is rotated, an end surface of the cylindrical member and an end surface of the cylindrical portion of the mixed member are brought into contact with each other and pressure is applied to the end surfaces, to join the cylindrical member and the mixed member. Then, a burr generated in a joint during joining is removed by cutting. When the rod and a sliding contact member are in sliding contact with each other in such a joint, careful deburring is required before a machining step for machining the rod into a final shape. For example, before the machining step for machining the rod into the final shape, it is required to perform a dedicated step of cutting and removing a burr and a pre-polishing step of polishing the entire outer peripheral portion including a portion from which a burr is cut and removed.

Meanwhile, the rod 41 of the cylinder device 11 of the present embodiment has the main shaft 42 that is hollow and is in sliding contact with the rod guide 31 and the seal member 33, and the mounting shaft 43 and the coupling shaft 44 that do not come into sliding contact with the rod guide 31 and the seal member 33. The inner peripheral portion of the main shaft 42 is joined to the outer peripheral portion of the mounting shaft 43 and the outer peripheral portion of the coupling shaft 44 by friction weld joining. In this case, the outer diameters of the mounting shaft 43 and the coupling shaft 44 are smaller than the outer diameter of the main shaft 42. For this reason, even if the burrs 132 and 134 are generated by friction weld joining, the burrs 132 and 134 can be generated in a position not to reach the main outer peripheral portion 51 of the main shaft 42 which is in sliding contact with the rod guide 31 and the seal member 33. Therefore, it is not required to perform deburring before the machining step S6 for machining the rod 41 into a final shape, and even if deburring is performed, the deburring can be performed in a short time. Therefore, the production of the rod 41 of the cylinder device 11 can be facilitated and the working man-hour can be reduced.

Namely, the method for producing the rod 41 includes the preparation step S1 of preparing the main shaft forming member 42A that is hollow and is a portion in sliding contact with the rod guide 31 of the rod 41 and the seal member 33, and the mounting shaft forming member 43A and the coupling shaft forming member 44A that are portions not coming into sliding contact with the rod guide 31 of the rod 41 and the seal member 33 and are formed to have portions having smaller outer diameters than the outer diameter of the main shaft forming member 42A. In addition, the production method includes the mounting shaft forming member approaching step S2 of causing the inner peripheral surface of the main shaft forming member 42A and the outer peripheral surface of the mounting shaft forming member 43A to approach each other while rotating the mounting shaft forming member 43A, and the mounting shaft joining step S3 of pushing the main shaft forming member 42A and the mounting shaft forming member 43A into each other by the predetermined amount in the axial direction after the inner peripheral surface of the main shaft forming member 42A and the outer peripheral surface of the mounting shaft forming member 43A are brought into contact with each other, to join the main shaft forming member 42A and the mounting shaft forming member 43A by friction weld joining. In addition, the production method includes the coupling shaft forming member approaching step S4 of causing the inner peripheral surface of the main shaft forming member 42A and the outer peripheral surface of the coupling shaft forming member 44A to approach each other while rotating the coupling shaft forming member 44A, and the coupling shaft joining step S5 of pushing the main shaft forming member 42A and the coupling shaft forming member 44A into each other by the predetermined amount in the axial direction after the inner peripheral surface of the main shaft forming member 42A and the outer peripheral surface of the coupling shaft forming member 44A are brought into contact with each other, to join the main shaft forming member 42A and the coupling shaft forming member 44A by friction weld joining. Accordingly, the rod 41 described above can be easily produced and the production of the rod 41 can be facilitated.

In addition, since the method for producing the rod 41 includes the male screw forming step of forming a screw in a portion of the mounting shaft forming member 43A other than the welded portion 131 between the mounting shaft forming member 43A and the main shaft forming member 42A and removing the burr 132 of the welded portion 131, the burr 132 can be removed by cutting, together with forming a screw in the mounting shaft forming member 43A. Therefore, the burr 132 can be removed without performing a dedicated step. Similarly, since the method for producing the rod 41 includes the male screw and the like forming step of forming a screw in a portion of the coupling shaft forming member 44A other than the welded portion 133 between the coupling shaft forming member 44A and the main shaft forming member 42A and removing the burr 134 of the welded portion 133, the burr 134 can be removed by cutting, together with forming a screw in the coupling shaft forming member 44A. Therefore, the burr 134 can be removed without performing a dedicated step. Therefore, the equipment cost and the working man-hour can be reduced.

In addition, since the end portions of the inner peripheral portion of the main shaft forming member 42A are the one end conical hole portion 101 and the other end conical hole portion 103, the inner peripheral portion of the main shaft forming member 42A can be favorably joined to the outer peripheral portions of the mounting shaft forming member 43A and the coupling shaft forming member 44A by friction weld joining.

In addition, the end portions of the inner peripheral portion of the main shaft forming member 42A are the one end conical hole portion 101 and the other end conical hole portion 103, the end portion on the joined side of the mounting shaft forming member 43A is the conical outer peripheral portion 111, and the end portion on the joined side of the coupling shaft forming member 44A is the conical outer peripheral portion 121. For this reason, the inner peripheral portion of the main shaft forming member 42A can be favorably joined to the outer peripheral portions of the mounting shaft forming member 43A and the coupling shaft forming member 44A by friction weld joining. Here, as described above, when the inner peripheral portion of the main shaft forming member 42A is joined to the outer peripheral portion of the mounting shaft forming member 43A and the outer peripheral portion of the coupling shaft forming member 44A by friction weld joining, each of the welded portions 131 and 133 has a cylindrical shape that is extended toward an end portion side of the main shaft 42.

Here, the angles of the one end conical hole portion 101 and the other end conical hole portion 103 with respect to the axis of the main shaft forming member 42A is 3° to 8°. For this reason, the inner peripheral portion of the main shaft forming member 42A can be more favorably joined to the outer peripheral portion of the mounting shaft forming member 43A by friction weld joining. In addition, the inner peripheral portion of the main shaft forming member 42A can be more favorably joined to the outer peripheral portion of the coupling shaft forming member 44A by friction weld joining. Namely, when the angles of the one end conical hole portion 101 and the other end conical hole portion 103 with respect to the axis of the main shaft forming member 42A is less than 3°, contact between the main shaft forming member 42A and the mounting shaft forming member 43A and the coupling shaft forming member 44A is unstable, even if conditions are changed, the above members can be joined only by only approximately 2 to 5 mm, and even if the push-in amount or the like is increased, only burr grows. In addition, when the above angles are larger than 8°, the joint area is increased and the torque of the friction welding machine that rotates the mounting shaft forming member 43A and the coupling shaft forming member 44A with respect to the main shaft forming member 42A is increased. In addition, when the above angles are larger than 8°, a workpiece work becomes slippery or a motor of the friction welding machine is overloaded. In addition, when the angles are larger than 8°, the thicknesses of the end portion sides of the main shaft forming member 42A are small, and thus the main shaft 42 may be deformed. The above defects can be avoided by setting the angles in a range of 3° to 8°.

In the above embodiment, after the mounting shaft joining step S3, the coupling shaft forming member approaching step S4 is performed. Meanwhile, before the mounting shaft forming member approaching step S2 and the mounting shaft joining step S3, the coupling shaft forming member approaching step S4 and the coupling shaft joining step S5 may be performed. In addition, the mounting shaft forming member approaching step S2 and the mounting shaft joining step S3 may be performed in parallel with the coupling shaft forming member approaching step S4 and the coupling shaft joining step S5.

In addition, the case where in the mounting shaft forming member approaching step S2 and the mounting shaft joining step S3 of the embodiment, the main shaft forming member 42A is fixed and the mounting shaft forming member 43A is rotated has been described as an example. Meanwhile, the mounting shaft forming member 43A may be fixed and the main shaft forming member 42A may be rotated, or both of the main shaft forming member 42A and the mounting shaft forming member 43A may be rotated. Namely, while at least one of the main shaft forming member 42A and the mounting shaft forming member 43A is rotated, the inner peripheral surface of the one end conical hole portion 101 of the main shaft forming member 42A and the outer peripheral surface of the conical outer peripheral portion 111 of the mounting shaft forming member 43A may be caused to approach each other and brought into pressure contact.

Similarly, the case where in the coupling shaft forming member approaching step S4 and the coupling shaft joining step S5 of the embodiment, the main shaft forming member 42A is fixed and the coupling shaft forming member 44A is rotated has been described as an example. Meanwhile, the coupling shaft forming member 44A may be fixed and the main shaft forming member 42A may be rotated, or both of the main shaft forming member 42A and the coupling shaft forming member 44A may be rotated. Namely, while at least one of the main shaft forming member 42A and the coupling shaft forming member 44A is rotated, the inner peripheral surface of the other end conical hole portion 103 of the main shaft forming member 42A and the outer peripheral surface of the conical outer peripheral portion 121 of the coupling shaft forming member 44A may be caused to approach each other and brought into pressure contact.

In addition, in the embodiment, the case where the end portions of the inner peripheral portion of the main shaft forming member 42A are the one end conical hole portion 101 and the other end conical hole portion 103, the end portion of the mounting shaft forming member 43A, the end portion being joined to the main shaft forming member 42A, is the conical outer peripheral portion 111, and the end portion of the coupling shaft forming member 44A, the end portion being joined to the main shaft forming member 42A, is the conical outer peripheral portion 121 has been described as an example. Meanwhile, the end portion on the joined side of the mounting shaft forming member 43A may have a columnar shape, and the end portion on the joined side of the coupling shaft forming member 44A may have a columnar shape. Namely, the one end conical hole portion 101 and the other end conical hole portion 103 may be formed in at least the end portions of the inner peripheral portion of the main shaft forming member 42A.

In addition, in the embodiment, the case where in the machining step S6 to be performed after the mounting shaft joining step S3 and the coupling shaft joining step S5, the male screw forming step of forming the male screw 57 of the mounting shaft 43 and the male screw and the like forming step of forming the fitting outer peripheral portion 62 and the male screw 65 of the coupling shaft 44 have been described as an example. Meanwhile, the male screw 57 of the mounting shaft 43 may be formed in the mounting shaft forming member 43A in advance, and the fitting outer peripheral portion 62 and the male screw 65 of the coupling shaft 44 may be formed in the coupling shaft forming member 44A in advance. Then, thereafter, the mounting shaft forming member approaching step S2 and the mounting shaft joining step S3 may be performed, and the coupling shaft forming member approaching step S4 and the coupling shaft joining step S5 may be performed. Namely, a step of forming a screw in the mounting shaft 43 of the mounting shaft forming member 43A in advance before the step of joining the main shaft forming member 42A and the mounting shaft forming member 43A may be provided. Namely, a step of forming a screw in the coupling shaft 44 of the coupling shaft forming member 44A in advance before the step of joining the main shaft forming member 42A and the coupling shaft forming member 44A may be provided. As described above, even if the burrs 132 and 134 are generated by friction weld joining, the burrs 132 and 134 can be generated in a position not to reach the main outer peripheral portion 51 of the main shaft 42 which is in sliding contact with the rod guide 31 and the seal member 33, and thus a screw is formed in advance; and thereby, the machining step S6 that is a post step of the mounting shaft joining step S3 and the coupling shaft joining step S5 can be also eliminated.

Figure 12:
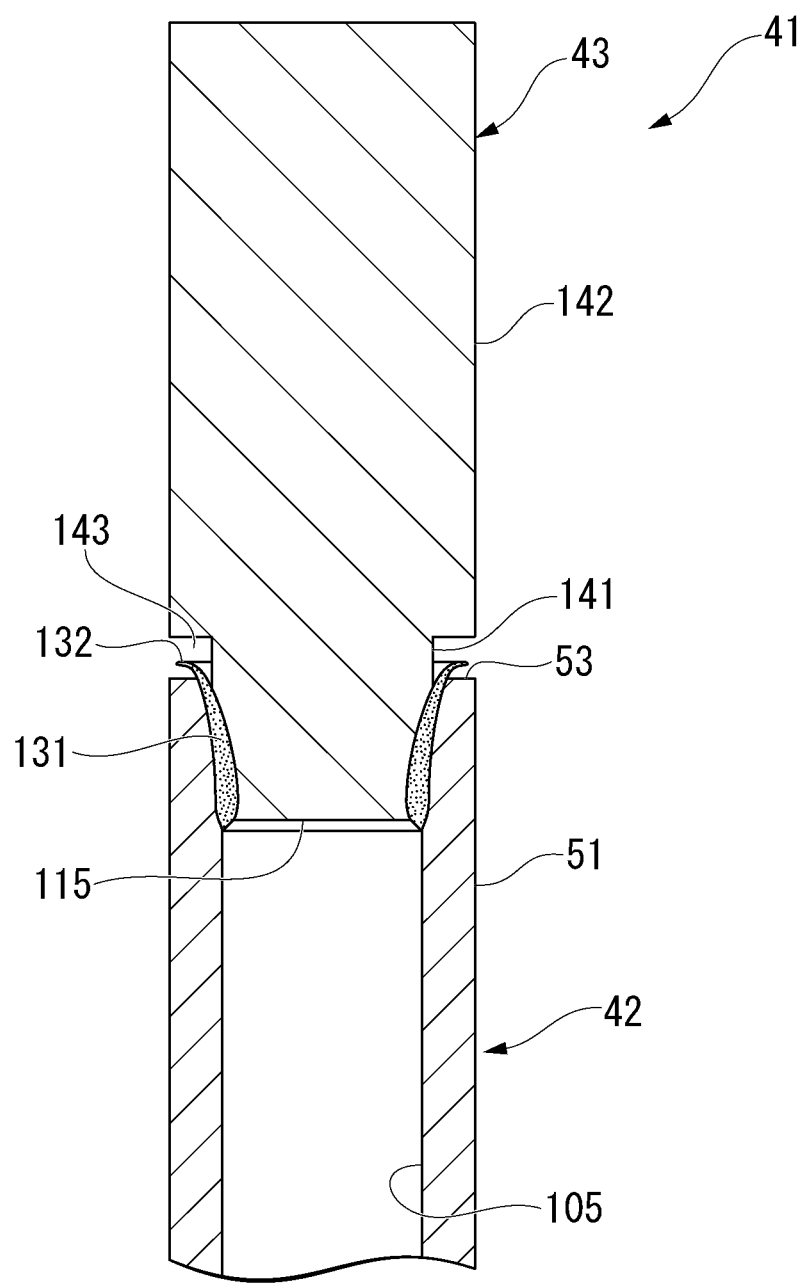
FIG. 12 is a sectional view illustrating a modified example of the rod of the cylinder device according to one embodiment of the invention.

In addition, in the embodiment, the overall outer diameter of each of the mounting shaft 43 and the coupling shaft 44 is smaller than the outer diameter of the main shaft 42; however, the outer diameter of only a main shaft 42 side end portion of a portion protruding from the main shaft 42 may be smaller than the outer diameter of the main shaft 42. Namely, in each of the mounting shaft 43 and the coupling shaft 44, the outer diameter of at least the main shaft 42 side end portion of the portion protruding from the main shaft 42 may be smaller than the outer diameter of the main shaft 42. For example, as in the mounting shaft 43 illustrated in FIG. 12, the mounting shaft 43 may have a large-diameter portion 142, of which the outer diameter is larger than that of a small-diameter portion 141 that is the main shaft 42 side end portion of the portion protruding from the main shaft 42 and the outer diameter is equal to or larger than the outer diameter of the main shaft 42, in a position apart from the main shaft 42 in the axial direction. In this case, the large-diameter portion 142 of the mounting shaft 43 has a space 143 in the axial direction between the large-diameter portion 142 and the main shaft 42. The same applies to the coupling shaft 44.

In addition, in the embodiment, the overall outer diameter of the main shaft 42 is larger than the outer diameters of the mounting shaft 43 and the coupling shaft 44; however, in the main shaft 42, the outer diameter of a portion that is not in sliding contact with the rod guide 31 and the seal member 33 may be smaller than that of a portion in sliding contact therewith. Namely, the outer diameter of a portion of the main shaft 42, the portion being in sliding contact with the rod guide 31 and the seal member 33 also during assembly, may be larger than the outer diameter of the main shaft 42 side end portion of the portion of each of the mounting shaft 43 and the coupling shaft 44, the portion protruding from the main shaft 42. In order to join the inner peripheral portion of the main shaft 42 and the outer peripheral portion of the mounting shaft 43 by friction weld joining, the outer diameter of at least a mounting shaft 43 side end portion of the main shaft 42 is set to be larger than the outer diameter of the main shaft 42 side end portion of the portion of the mounting shaft 43, the portion protruding from the main shaft 42. In order to join the inner peripheral portion of the main shaft 42 and the outer peripheral portion of the coupling shaft 44 by friction weld joining, the outer diameter of at least a coupling shaft 44 side end portion of the main shaft 42 is set to be larger than the outer diameter of the main shaft 42 side end portion of the portion of the coupling shaft 44, the portion protruding from the main shaft 42.

In addition, in the embodiment, the case where the main shaft forming member 42A is hollow over the overall length thereof in the axial direction has been described as an example. Meanwhile, at least portions to be joined to the mounting shaft forming member 43A and the coupling shaft forming member 44A may be hollow.

In addition, in the embodiment, the cylinder device 11 in which the cylinder 15 has the opening portion 23 only on one end side has been described as an example. Meanwhile, the invention is also applicable to a cylinder device in which the cylinder 15 has opening portions on both end sides. Namely, the invention is applicable to a cylinder device including a cylinder that has a cylindrical shape and has an opening portion on at least one end side.

According to a first aspect of the above-described embodiment, there is provided a cylinder device including: a cylinder that has a cylindrical shape and has an opening portion on at least one end side; a piston that slides in the cylinder and divides an inside of the cylinder into two chambers; a rod of which one end portion is joined to the piston in the cylinder and the other end portion protrudes from the opening portion of the cylinder; and a sliding contact member that is provided in the opening portion of the cylinder to be in sliding contact with the rod. The rod includes a first member that is a hollow cylindrical member in sliding contact with the sliding contact member, and a second member that does not come into sliding contact with the sliding contact member. An outer diameter of at least a first member side end portion of the second member is smaller than an outer diameter of the first member. An inner peripheral portion of the first member is joined to an outer peripheral portion of the second member by friction weld joining. Accordingly, the production of the rod, namely, the cylinder device including the rod can be facilitated.

According to a second aspect, in the first aspect, a welded portion between the inner peripheral portion of the first member and the outer peripheral portion of the second member has a cylindrical shape that is extended toward an end portion side of the first member.

According to a third aspect, in the first or second aspect, a space is provided between the first member and the second member.

According to a fourth aspect, there is provided a method for producing a rod of which one end portion is joined to a piston dividing an inside of a cylinder, which has a cylindrical shape and has an opening portion on at least one end side, into two chambers and the other end portion protrudes through a sliding contact member provided in the opening portion of the cylinder, the method including: a step of preparing a first member that is hollow and is a portion of the rod, the portion being in sliding contact with the sliding contact member, and a second member that is a portion of the rod, the portion not coming into sliding contact with the sliding contact member, and is formed to have a portion having a smaller outer diameter than an outer diameter of the first member; a step of causing an inner peripheral surface of the first member and an outer peripheral surface of the second member to approach each other while rotating at least one of the first member and the second member; and a step of pushing the first member and the second member into each other by a predetermined amount in an axial direction after the inner peripheral surface of the first member and the outer peripheral surface of the second member are brought into contact with each other, to join the first member and the second member by friction weld joining. Accordingly, the production of the rod can be facilitated.

According to a fifth aspect, the method for producing a rod in the fourth aspect further includes a step of forming a screw in a portion of the second member other than a welded portion between the second member and the first member, and removing a burr of the welded portion.

According to a sixth aspect, the method for producing a rod in the fourth aspect further includes a step of forming a screw in the second member before the step of joining the first member and the second member.

According to a seventh aspect, in the fourth to sixth aspects, at least an end portion of an inner peripheral portion of the first member is a conical hole portion.

According to an eighth aspect, in the seventh aspect, an angle of the conical hole portion with respect to an axis of the first member is 3° to 8°.

INDUSTRIAL APPLICABILITY

According to the present invention, the production of the cylinder device can be facilitated.

REFERENCE SIGNS LIST

11 Cylinder device
15 Cylinder
23 Opening portion
31 Rod guide (sliding contact member)
33 Seal member (sliding contact member)
35 Piston
38 First chamber
39 Second chamber
41 Rod
42 Main shaft (first member)
42A Main shaft forming member (first member)
43 Mounting shaft (second member)
43A Mounting shaft forming member (second member)
44 Coupling shaft (second member)
44A Coupling shaft forming member (second member)
101 One end conical hole portion
103 The other end conical hole portion
131, 133 Welded portion
143 Space

The invention claimed is:

1. A method for producing a rod including one end portion is configured to be joined to a piston which divides an inside of a cylinder having a cylindrical shape and an opening on at least one end side thereof, into two chambers, and another end configured to protrude through a sliding contact member provided in the opening of the cylinder,
the method comprising:
a step of preparing a first member that is hollow and is to be a first portion of the rod, and a second member that is to be a second portion of the rod, wherein the second member has a smaller outer diameter than an outer diameter of the first member;
a step of causing an inner peripheral surface of the first member and an outer peripheral surface of the second member to approach each other while rotating at least one of the first member and the second member;
a step of joining the first member and the second member by friction weld joining by pushing the first member and the second member into each other in an axial direction after the inner peripheral surface of the first member and the outer peripheral surface of the second member are brought into contact with each other; and
a step of forming a screw in the second member at a position other than a welded portion between the second member and the first member and removing a burr of the welded portion at the same time.

2. The method for producing a rod according to claim 1, wherein at least an end portion of the inner peripheral surface of the first member is a conical hole portion.

3. The method for producing a rod according to claim 2, wherein an angle of the conical hole portion relative to an axis of the first member is 3° to 8°.

* * * * *